(12) United States Patent
Krueger et al.

(10) Patent No.: US 11,401,194 B2
(45) Date of Patent: Aug. 2, 2022

(54) METHOD AND DEVICE FOR SEPARATING A SUBSTRATE

(71) Applicant: LPKF Laser & Electronics AG, Garbsen (DE)

(72) Inventors: Robin Alexander Krueger, Hannover (DE); Norbert Ambrosius, Kevelaer (DE); Roman Ostholt, Langenhagen (DE)

(73) Assignee: LPKF LASER & ELECTRONICS AG, Garbsen (DE)

( * ) Notice: Subject to any disclaimer, the term of this patent is extended or adjusted under 35 U.S.C. 154(b) by 390 days.

(21) Appl. No.: 15/681,464

(22) Filed: Aug. 21, 2017

(65) Prior Publication Data

US 2017/0341971 A1 Nov. 30, 2017

Related U.S. Application Data

(62) Division of application No. 14/781,597, filed as application No. PCT/DE2014/100119 on Apr. 3, 2014, now Pat. No. 9,764,978.

(30) Foreign Application Priority Data

Apr. 4, 2013 (DE) ..................... 10 2013 103 370.9
Oct. 31, 2013 (DE) ..................... 10 2013 112 035.0

(51) Int. Cl.
*C03B 33/02* (2006.01)
*B23K 26/53* (2014.01)
(Continued)

(52) U.S. Cl.
CPC ...... *C03B 33/0222* (2013.01); *B23K 26/0006* (2013.01); *B23K 26/064* (2015.10);
(Continued)

(58) Field of Classification Search
CPC ........... B23K 26/0006; B23K 26/0619; B23K 26/0624; B23K 2201/40; B23K 2203/50;
(Continued)

(56) References Cited

U.S. PATENT DOCUMENTS

| 4,911,783 A | 3/1990 | Voboril |
| 6,400,172 B1 | 6/2002 | Akram et al. |

(Continued)

FOREIGN PATENT DOCUMENTS

| CN | 101083292 A | 12/2007 |
| CN | 101391860 A | 3/2009 |

(Continued)

*Primary Examiner* — Dana Ross
*Assistant Examiner* — Joe E Mills, Jr.
(74) *Attorney, Agent, or Firm* — Leydig, Voit & Mayer, Ltd.

(57) ABSTRACT

An aspect of the invention provides a device, comprising: a laser machining head configured to deflect laser radiation onto an optical system comprising a substrate, the device being configured to carry out a method for separating the substrate using the optical system, the optical system being configured to provide the laser radiation, a thickness of the substrate not exceeding 2 mm in a region of a separating line, the method comprising: applying pulsed laser radiation having a pulse duration (t) to a substrate material of the substrate using the optical system, the substrate material being transparent at least in part to a laser wavelength of the pulsed laser radiation, the pulsed laser radiation being focused using the optical system at an original focal depth (f1), an intensity of the pulsed laser radiation leading to a modification of the substrate along a beam axis (Z) of the pulsed laser radiation.

3 Claims, 4 Drawing Sheets

Figure 1:
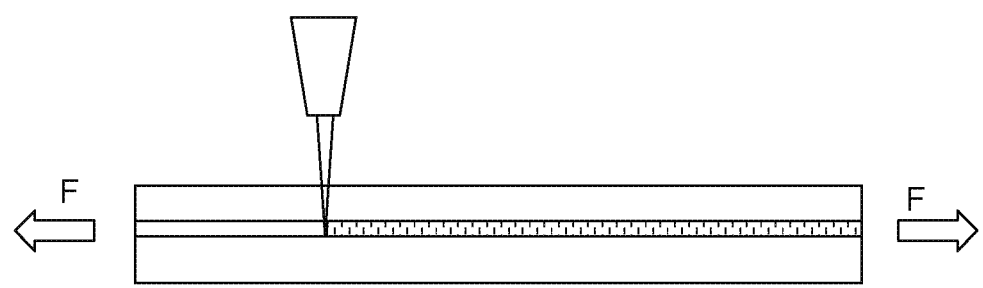

(51) Int. Cl.

| | |
|---|---|
| *B23K 26/00* | (2014.01) |
| *B23K 26/06* | (2014.01) |
| *B23K 26/0622* | (2014.01) |
| *C03B 33/033* | (2006.01) |
| *C03B 33/09* | (2006.01) |
| *B23K 26/064* | (2014.01) |
| *B23K 26/364* | (2014.01) |
| *B23K 26/402* | (2014.01) |
| *C03C 15/00* | (2006.01) |
| *C03C 17/00* | (2006.01) |
| *B23K 101/40* | (2006.01) |
| *B23K 103/00* | (2006.01) |

(52) U.S. Cl.
CPC ...... *B23K 26/0619* (2015.10); *B23K 26/0624* (2015.10); *B23K 26/364* (2015.10); *B23K 26/402* (2013.01); *B23K 26/53* (2015.10); *C03B 33/033* (2013.01); *C03B 33/091* (2013.01); *C03C 15/00* (2013.01); *C03C 17/002* (2013.01); *B23K 2101/40* (2018.08); *B23K 2103/50* (2018.08); *B23K 2103/54* (2018.08); *B23K 2103/56* (2018.08); *C03C 2218/32* (2013.01)

(58) Field of Classification Search
CPC ............ B23K 2203/56; B23K 26/0057; B23K 26/064; B23K 26/364; B23K 26/402; B23K 2101/40; B23K 2103/50; B23K 2103/54; B23K 2103/56; B23K 2203/54; B23K 26/53; C03C 2218/32; C03C 17/002; C03C 15/00; C03B 33/091; C03B 33/033; C03B 33/0222

See application file for complete search history.

(56) References Cited

U.S. PATENT DOCUMENTS

| | | | |
|---|---|---|---|
| 8,518,800 B2 | 1/2013 | Fujii et al. | |
| 2004/0002199 A1 | 1/2004 | Fukuyo et al. | |
| 2006/0099810 A1 | 5/2006 | Voronov et al. | |
| 2007/0298529 A1 | 12/2007 | Maeda et al. | |
| 2009/0197395 A1 | 8/2009 | Nakamura et al. | |
| 2009/0245302 A1 | 10/2009 | Baird et al. | |
| 2010/0236819 A1 | 9/2010 | Chiang et al. | |
| 2011/0000897 A1* | 1/2011 | Nakano .............. | B23K 26/0006 219/121.72 |
| 2011/0193269 A1* | 8/2011 | Ito ........................ | B23K 26/032 264/400 |
| 2012/0142186 A1 | 6/2012 | Shimoi et al. | |
| 2012/0156816 A1* | 6/2012 | Okamura ............. | B28D 5/0011 438/33 |
| 2012/0234807 A1* | 9/2012 | Sercel ................... | B23K 26/40 219/121.69 |
| 2013/0029092 A1 | 1/2013 | Wakioka | |
| 2013/0126573 A1 | 5/2013 | Hosseini et al. | |
| 2013/0210245 A1 | 8/2013 | Jackl | |
| 2013/0344302 A1 | 12/2013 | Helie et al. | |
| 2014/0080288 A1 | 3/2014 | Fukuyo et al. | |
| 2014/0147624 A1 | 5/2014 | Streltsov et al. | |
| 2015/0038313 A1 | 2/2015 | Hosseini | |
| 2016/0059359 A1 | 3/2016 | Krueger | |
| 2016/0067822 A1 | 3/2016 | Arai et al. | |
| 2016/0107925 A1 | 4/2016 | Burket et al. | |
| 2016/0152516 A1 | 6/2016 | Bazemore et al. | |
| 2016/0280580 A1 | 9/2016 | Bohme | |

FOREIGN PATENT DOCUMENTS

| | | |
|---|---|---|
| CN | 101733551 A | 6/2010 |
| CN | 102513700 A | 6/2012 |
| DE | 10154361 A1 | 5/2003 |
| DE | 102010025966 B4 | 1/2012 |
| EP | 2503859 A1 | 9/2012 |
| JP | 2001242495 A | 9/2001 |
| JP | 2005288501 A | 10/2005 |
| JP | 2009182178 A | 8/2009 |
| JP | 2009226457 A | 10/2009 |
| JP | 2010158691 A | 7/2010 |
| JP | 2011516266 A | 5/2011 |
| JP | 2011222700 A | 11/2011 |
| JP | 2013016867 A | 1/2013 |
| KR | 20100120297 A | 11/2010 |
| WO | WO 2008126742 A1 | 10/2008 |
| WO | WO 2009137174 A1 | 11/2009 |
| WO | WO 2011163149 A2 | 12/2011 |
| WO | WO 2012006736 A2 | 1/2012 |
| WO | WO 2012094737 A1 | 7/2012 |

* cited by examiner

METHOD AND DEVICE FOR SEPARATING A SUBSTRATE

CROSS-REFERENCE TO RELATED APPLICATIONS

This application is a divisional of co-pending U.S. patent application Ser. No. 14/781,597, filed Oct. 1, 2015, which is a U.S. national stage application under 35 U.S.C. § 371 of International Application No. PCT/DE2014/100119, filed on Apr. 3, 2014, which claims benefit to German Patent Application Nos. DE 10 2013 103 370.9, filed on Apr. 4, 2013, and DE 10 2013 112 035.0, filed on Oct. 31, 2013. The International Application was published in German on Oct. 9, 2014 as WO 2014/161535 A2 under PCT Article 21(2).

FIELD

The invention relates to a method and a device for separating, in particular breaking up, a substrate, in particular a glass substrate, which is usable for example as an interposer or microcomponent, using a laser beam.

BACKGROUND

A method of this type and a device for carrying out the separation process are used in practice for example for separating or splitting wafers, glass substrates and plates. Substrates of this type are also used for example as interposers for electrically connecting the terminals of a plurality of homogeneous or heterogeneous microchips.

In practice, separation by cutting is a critical step in the processing of wafers or glass substrates, which is typically based on the use of diamond cutting tools and carried out for example at a speed of 30 cm/s for displays. However, the quality of the edges which can be achieved by this process is unsatisfactory, and leads to significant drawbacks in terms of the service life, quality and reliability of the product, but also in the resulting cleaning costs.

In this context, it is found to be a challenge to process the substrate into usable elements. The prior art has not yet addressed, in particular, the economical production of the plurality of separating faces in a substrate for example in the production of wafers.

US 2013/126573 A1 discloses a separating method for producing a substrate in which the substrate is irradiated with one or more pulses of a focused laser beam. In this context, the substrate is transparent to the focused laser beam, whilst the laser pulses are selected in such a way, in terms of the energy and pulse duration, that a duct-like filament is produced within the substrate. By displacing the substrate relative to the focused laser beam, additional, spatially separated filaments are produced, which thus define a separating face. The substrate consists for example of glass, crystal, quartz, diamond or sapphire. For a corresponding material thickness of the substrate, a plurality of focal points of the focused laser beam are selected in such a way that filaments are produced in at least one of the two or more layers. In this context, the filament produced by the focused laser beam in a first layer should propagate into at least one additional layer and produce a second filament in this further layer. Further, it may also be provided for a second beam focus to be produced in a second layer. In this method, the use of comparatively expensive femtosecond or picosecond lasers and the complex configuration, in which a pulse sequence of individual pulses and of particular repetition rates of the pulse sequences in accordance with particular prescriptions is provided, are found to be disadvantageous. In particular, a time delay between successive pulses in the pulse sequence is smaller than a duration of the relaxation of a material modification.

The term "stealth dicing" refers to a laser machining method in which in a first step a laser beam acts on a layer within a substrate. In a second step a tensile stress is applied so as to separate the substrate along the action points in the layer. This layer is an internal surface in the wafer, which is modified by the laser within the substrate during the processing and forms the starting point for dividing the substrate during the processing. The tensile stress subsequently brings about the separation of the substrate into small portions.

A method of this type for separating a substrate, for example a semiconductor substrate in the production of a semiconductor component or the like, is known for example from U.S. Pat. No. 8,518,800 B2. In this context, the substrate is irradiated with laser light in such a way that a multiphoton absorption phenomenon is produced within the substrate, whereby a light convergence point and thus a modified area are formed within the substrate. By forming a cutting onset point region within the substrate, a break is produced in the substrate in the direction of the thickness extent thereof, without external action or whilst exerting a force, starting from the cutting onset point region which acts as the starting point.

EP 2 503 859 A1 further discloses a method in which a glass substrate is provided with through-holes, the glass substrate consisting of an insulator such as glass, for example silicate glass, sapphire, plastics material or ceramic and semiconductors such as silicon. The glass substrate is irradiated using a laser, for example a femtosecond laser, which is focused on a focal point at a desired position within the glass substrate. The through-holes are produced by a method in which the regions of the glass substrate which have been modified by the laser are dipped in an etching solution and the modified regions are thus removed from the glass substrate. This etching makes use of the effect whereby the modified region is etched extremely rapidly by comparison with the unmodified regions of the glass substrate. Blind holes or through-openings can be produced in this manner. A copper solution is suitable for filling the through-opening. To achieve a desired depth effect, in other words a through-hole between the outer substrate faces, the focal point has to be displaced during continuous irradiation, in other words tracked in the direction of the z-axis.

More generally, the combination of selective laser treatment with a subsequent etching process in the form of selective laser-induced etching is also known as ISLE (in-volume selective laser-induced etching).

DE 10 2010 025 966 B4 further discloses a method in which in a first step focused laser pulses are directed onto the glass substrate, the radiation intensity of said pulses being high enough to result in local athermal decomposition along a filament-like track in the glass. In a second method step, the filament-like tracks are expanded into holes by supplying high-voltage power to opposing electrodes, resulting in dielectric breakdowns through the glass substrate along the filament-like tracks. These breakdowns expand under electrothermal heating and evaporation of hole material, until the process is halted by switching off the power supply upon achieving the desired hole diameter. Alternatively or in addition, the tracks may also be expanded using reactive gases, which are directed onto the hole sites using nozzles. The through-opening sites may also be expanded using supplied etching gas. The comparatively complex process, resulting from the fact the glass substrate initially has to be broken through by the athermal decomposition and the diameter of the filament-like tracks has to be expanded into holes in the following step, has proved to be disadvantageous.

Further, U.S. Pat. No. 6,400,172 B1 discloses the introduction of through-openings in semiconductor materials by laser.

SUMMARY

An aspect of the invention provides a device, comprising: a laser machining head configured to deflect laser radiation onto an optical system comprising a substrate, the device being configured to carry out a method for separating the substrate using the optical system, the optical system being configured to provide the laser radiation, a thickness of the substrate not exceeding 2 mm in a region of a separating line, the method comprising: applying pulsed laser radiation having a pulse duration (t) to a substrate material of the substrate using the optical system, the substrate material being transparent at least in part to a laser wavelength of the pulsed laser radiation, the pulsed laser radiation being focused using the optical system at an original focal depth (f1), an intensity of the pulsed laser radiation leading to a modification of the substrate along a beam axis (Z) of the pulsed laser radiation, but not to material removal which goes all the way through the substrate, and the pulsed laser radiation being moved along any desired separating line parallel to a primary extension plane of the substrate, bringing about a subsequent separation process along the separating line, wherein the pulsed laser radiation is focused by the optical system, which is unchanged per se, by non-linear self-focusing within the pulse duration (t) of an individual pulse (P) of the pulsed laser radiation at a focal depth (f2) different from the original focal depth (f1), and wherein a numerical aperture (NA) of the optical system is greater than 0.3.

BRIEF DESCRIPTION OF THE DRAWING(S)

Figure 2A:
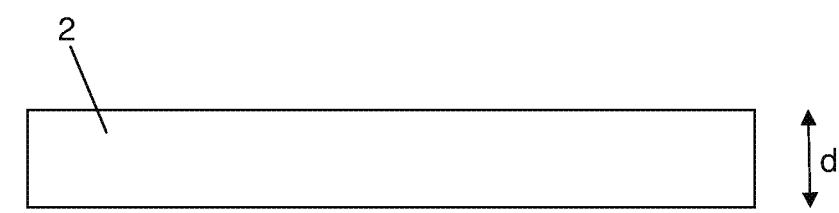
Figure 2B:
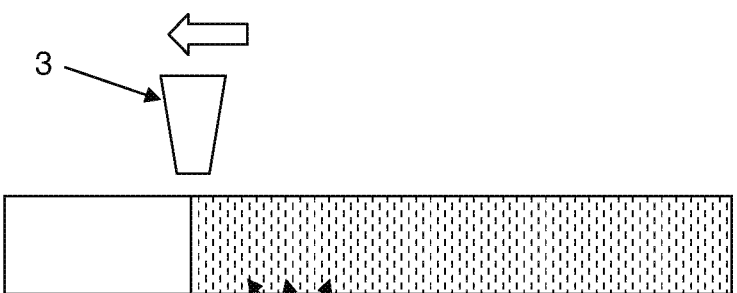
Figure 2C:
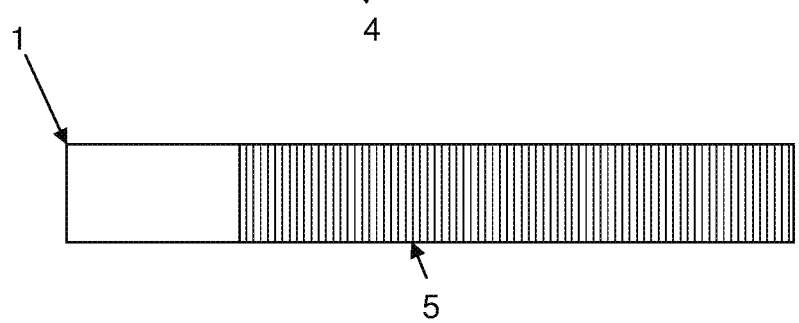
Figure 3A:
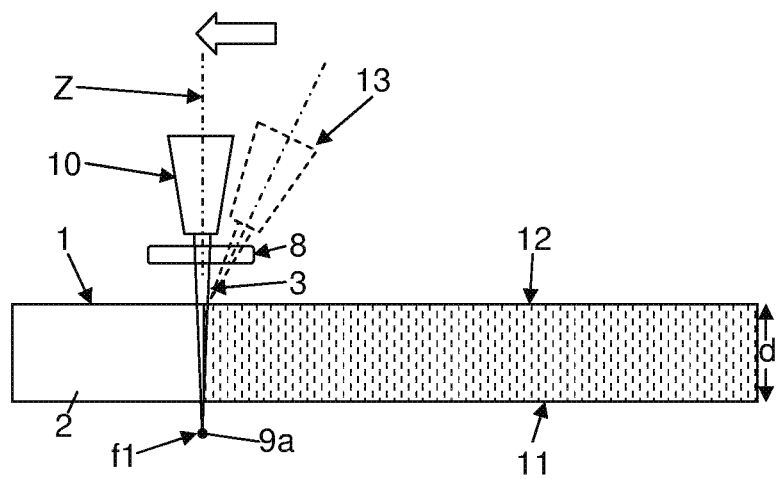
Figure 3B:
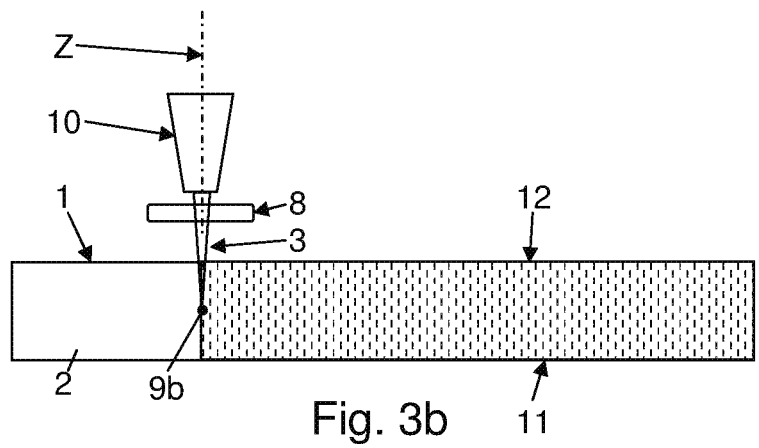
Figure 3C:
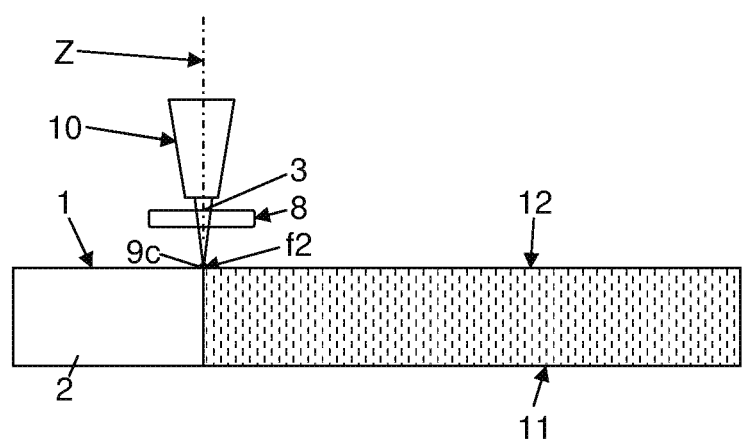
Figure 4:
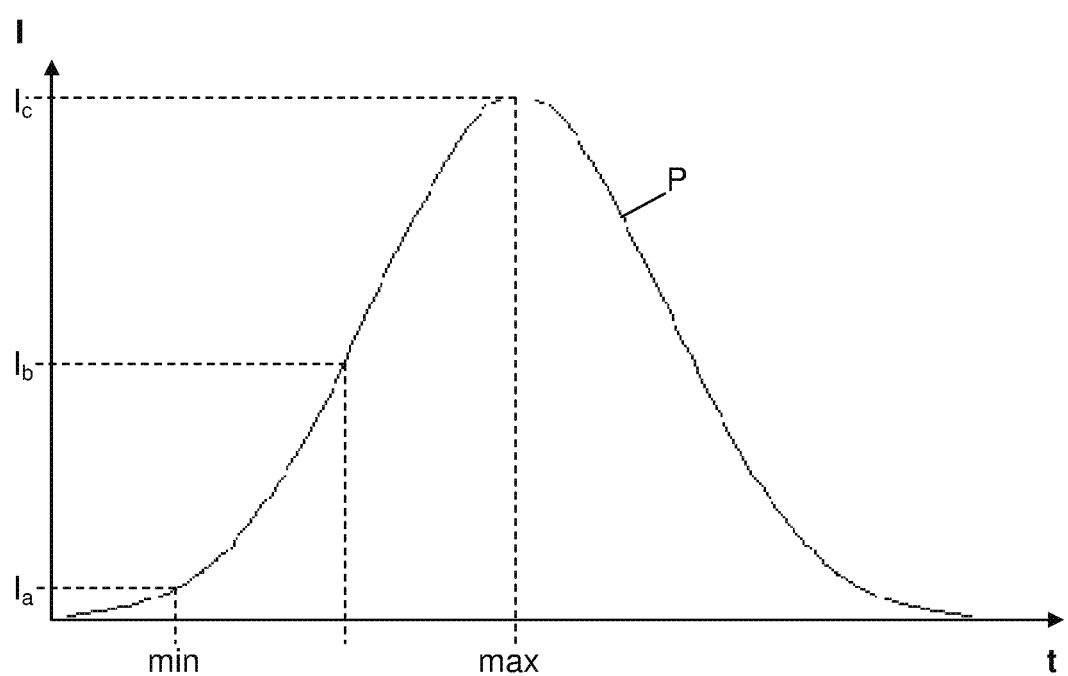

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a schematic drawing of a prior art method;

FIGS. 2*a*, 2*b*, 2*c* show a flow chart comprising a plurality of method steps for introducing a plurality of through-openings into a substrate;

FIGS. 3*a*, 3*b*, 3*c* show the intensity-dependent focal point during an individual pulse; and FIG. 4 is a graph showing the intensity distribution over time during the duration of an individual pulse.

DETAILED DESCRIPTION

An aspect of the invention provides an option for substantially simplifying a method and a device for separating a substrate, and in particular for reducing the time taken to carry this out.

An aspect of the invention thus provides a method in which the laser radiation is focused by non-linear self-focusing within the pulse duration of a single pulse by the unchanged optical system using a focal depth differing from the original focal depth. The invention makes use of the fact that the intensity of a pulsed laser is not constant for an individual pulse, but rather has an intensity which increases to a maximum and subsequently falls away over the temporal progression of the individual pulse. Because the refractive index also increases to a maximum as a result of the increasing intensity, in a manner corresponding to a normal distribution over the temporal progression for an individual pulse, the focal depth of the optical system, in other words the distance from a laser machining head or the lens, changes, independently of the geometric focal point determined by the focusing optics.

This effect of non-linear self-focusing is made use of in that the distance between the focal points between a maximum and a minimum intensity at least corresponds to the desired longitudinal extent, in other words to the thickness in the region of a separating line. In a surprisingly simple manner, this results in a spatial displacement in the direction of the beam axis during the duration of an individual pulse, which leads to the desired modification in the region of the entire primary extension, in the direction of the beam axis. Tracking of the focal point, which is unavoidable in the prior art, can be omitted in this case. Thus, in particular, no control system for moving the laser focus through the substrate is required. In this way, a modified region of the substrate is produced along the separating line as a separating face or predetermined breaking face. Thus, according to the invention, not only is the control system outlay required for this purpose omitted, but the machining duration can also be considerably reduced, for example to the duration of an individual pulse. The non-linear refractive index of the transmissive medium is a linear function of the intensity, and so the selection of a suitable material and suitable dimensions is dependent on the intensity of the laser radiation used.

In this context, the laser beam is directed onto the substrate sufficiently briefly that the substrate is merely modified along a beam axis of the laser beam, without destruction which penetrates through the substrate occurring, anisotropic material removal for example being carried out in the next step in the regions of the substrate which have previously undergone modification by means of the laser beam, so as thus to carry out the separation optionally in connection with an assisting external force action.

The laser power input is used to excite or trigger a reaction and a modification by conversion, the effect of which is only made use of for or only leads to the desired material removal in the subsequent method step.

Because the separation process, on the basis of the modification and optionally subsequent anisotropic material removal, is carried out by an etching method, it is possible to use a planar-action removal method, which only places very low requirements on the process, rather than a sequential one for the separation process. Instead, over the duration of action, the material duration can be carried out quantitatively and qualitatively for all regions which are pre-treated in the described manner and correspondingly modified, reducing the expenditure of time for producing the plurality of recesses or through-openings considerably overall.

The focal point at minimum intensity may be directed onto an outer surface of the substrate. However, it has already been found to be particularly promising if the laser radiation is focused onto a remote side of the substrate at a distance therefrom, in such a way that the focal point of the laser radiation is set so as to be positioned on a rear side, remote from the laser radiation, at a distance from the surface of the substrate. As a result, the laser beam is initially directed onto a focal point positioned outside the substrate. The refractive index which changes as a result of the increasing intensity subsequently leads to a spatial displacement of the focal point through the substrate along the beam axis. This ensures that a sufficiently high intensity for producing the modification is applied to every focal point within the substrate.

The duration of the beam action may, of course, comprise a plurality of pulse durations for an unchanged relative position of the laser machining head with respect to the substrate, for example so as further to optimise the modification of the substrate material. However, it is particularly advantageous if the laser beam is deflected onto each focal point for the duration of a single pulse. In this way, the previous and subsequent pulses of the laser beam are directed onto positions spaced apart in the plane of the substrate, in such a way that adjacent focal points are spaced apart in the plane of the substrate.

Preferably, the distance between the modifications to be produced adjacently in the substrate along the separating line is selected in such a way that the modified regions are directly mutually adjacent or have a very small distance between them.

The modifications may be produced by laser machining in which positioning of the laser machining head and the laser machining alternate. However, constant relative movement between the laser beam or laser machining head and the substrate is preferably carried out while the laser radiation is deflected onto the substrate, in such a way that the laser beam is continuously guided in a "floating" movement over the substrate, in such a way that an interrupted change in the relative position results in an extremely rapid machining duration. In particular, the relative position of the substrate with respect to the laser beam can be changed at a constant speed, in such a way that for a constant pulse frequency the spacing of the modifications to be produced adheres to a predetermined grid dimension.

Particularly preferably, the laser is operated at a wavelength to which the substrate is transparent, ensuring penetration of the substrate. In particular, this ensures a substantially cylindrical modification region coaxial with respect to the laser beam axis, which leads to a constant diameter of the through-opening or recess.

Further, it may also be advantageous if the laser also additionally removes a surface region so as to configure the action region in a manner resulting in a conical inlet region to the through-opening. In this manner, the subsequent separation process is simplified. In addition, the action of an etching agent is concentrated in this region, for example.

In another, also particularly promising embodiment of the method, the substrate is coated in a planar manner with an etch resist on at least one surface prior to the laser treatment. As a result of the action of a laser beam, the etch resist is removed on at least one surface in a dot-like action region and the modification is produced in the substrate simultaneously. In this way, the unmodified regions are protected against undesired action in the subsequent etching process, and the surface is therefore not damaged. The etch resist does not prevent the modification of the substrate positioned below. Rather, the etch resist is either permeable to the laser radiation or it is removed in a near dot-like manner by the laser radiation, that is to say evaporated, for example. Further, the possibility is not excluded that the etch resist may contain substances which act to promote the modification, for example which accelerate the modification process.

Fundamentally, the method is not limited to particular material compositions of the substrate. However, it is particularly promising for the substrate to comprise an aluminosilicate, in particular a boroaluminosilicate, as a significant material proportion.

A defined separating face can be produced along the modified regions, it optionally being possible to optimize the separation using additional external force action or a thermal after-treatment, in such a way that a subsequent etching method can be rendered superfluous.

Preferably, the material separation is brought about in the modified regions of the substrate by anisotropic material removal by liquid etching, dry etching or vapor phase etching, and optionally also by high-voltage or high-frequency evaporation. Optionally, the separation process may further be promoted by an external force action, in particular a tensile force or compressive force. Alternatively, the separation process can also be carried out without difficulty without external force actions if the substrate is biased under internal stress.

The second object is achieved according to the invention by a device comprising a laser machining head for deflecting laser radiation onto a substrate, in that the device is equipped with a transmissive medium, which in particular is provided with at least one planar face or is, for example, configured as a planar plate, and which has a higher intensity-dependent refraction index than air, and which is arranged in particular between the laser machining head and the substrate in such a way that the laser radiation can be deflected through the transmissive medium onto the substrate. As a result, according to the invention the intensity-dependent refractive index of the transmissive medium is exploited so as to produce an axial change in the focal point during the duration of each individual pulse and the accompanying fluctuation in intensity during the individual pulse, in connection with a pulsed laser. Thus, unlike in the prior art, the focal point is not unchanged, at least during the duration of an individual pulse, but rather the focal point is displaced along a line on the beam axis with respect to the total duration of the individual pulse. It is easy to see what significant advantages result in the present invention from the fact that the focal point is displaced without tracking of the focusing optics of the laser machining head. In particular, this greatly reduces the machining duration and also the control system outlay. For example, in a planar substrate the tracking of the z-axis can be omitted. To produce the desired separating face, a large number of laser pulses are introduced into the substrate mutually adjacently.

In principle, a variant is also conceivable in which the transmissive medium is arranged on the laser machining head upstream of focusing optics thereof in the direction of the beam path, in such a way that the laser radiation is initially deflected through the transmissive medium and subsequently through the focusing optics and directed onto the substrate.

The effect of the intensity-dependent light refraction can, of course, be adapted to the respective application, for example in that the transmissive medium is adapted or replaced accordingly or in that the laser beam passes through a plurality of transmissive media or through the same medium repeatedly.

The focal point may be directed onto a rear face of the substrate, remote from the laser machining head, and the transmissive medium may be formed in such a way that the intensity-dependent focal point reaches a front face, facing the laser machining head, at the intensity maximum. However, it is particularly expedient in practice if the laser radiation can be deflected onto a focal point at a distance from a rear face of the substrate, remote from the laser machining head, in such a way that the rear face of the substrate is reached during the increasing intensity progression rather than at an intensity minimum. This ensures a laser radiation intensity within the substrate which is always sufficient for the modification which is to be achieved.

In principle, any pulsed laser is suitable for the machining, a laser having a pulse duration of less than 50 ps, preferably less than 5 ps, having been found to be particularly expedient.

In addition, it is particularly expedient if, for focusing, the laser machining head has focusing optics having a numerical aperture (NA) greater than 0.3, in particular greater than 0.4.

A particularly promising embodiment of the device according to the invention is also achieved in that the focusing optics have a gradient index lens. As a result of a lens of this type, also known as a GRIN lens, the refractive index which decreases in the radial direction results in the reduction in intensity which otherwise occurs being generally compensated in the edge region of the lens.

It is further found to be advantageous if the transmissive medium consists of glass, in particular quartz glass, so as to provide a pronounced intensity-dependent refractive index.

In this context, the transmissive medium is preferably connected to the laser machining head and arranged so as to be movable together therewith and arranged in particular replaceably on the laser machining head. Rapid fixing, for example, is suitable for this purpose.

Preferably, the device is equipped with a continuously emitting laser in addition to a pulsed laser, the transmissive medium being transparent to the wavelength of the continuously emitting laser, and the continuously emitting laser being directed onto the glass substrate through the medium or directed onto the glass substrate while circumventing the transmissive medium. The wavelengths of the pulsed laser and of the continuously emitting laser may be different. Further, the laser radiation from the different laser sources may be directed onto the glass substrate from different sides.

FIG. 1 is a schematic drawing of a laser machining method also known as "stealth dicing". As can be seen, in this context the laser beam is directed onto a special intermediate layer within a substrate, said layer being modified by the laser radiation to form the starting point for the subsequent separation of the substrate. An external tensile stress subsequently brings about the separation of the substrate into sub-regions along the action points in the layer.

FIG. 2 shows the individual method steps of introducing a plurality of through-openings into an interposer 1, intended as a contacting element in circuit board production, comprising a substrate 2. For this purpose, laser radiation 3 is directed onto the surface of the substrate 2. The substrate 2 comprises a boroaluminosilicate as a significant material proportion, so as to ensure thermal expansion similar to that of silicon. The material thickness d of the substrate 2 is between 50 µm and 500 µm. The duration of action of the laser radiation 3 is selected to be extremely short, in such a way that merely a modification of the substrate 2 occurs concentrically about a beam axis of the laser beam, without resulting in significant destruction or considerable material removal of the substrate material. In particular, the duration of action is limited to the individual pulse. For this purpose, the laser is operated at a wavelength to which the substrate 2 is transparent. A region 4 modified in this manner is shown in FIG. 2b. In a following method step, shown in FIG. 2c, the modified regions 4 of the substrate 2 which have previously undergone modification by the laser radiation 3 form a separating face 5 along the linear succession of modified regions 4 in the substrate.

The following describes in more detail an important effect during the laser machining of the substrate 2 with reference to FIGS. 3 and 4. This is the intensity-dependent focal point during an individual pulse P. The invention is based on the finding that the intensity I of an individual pulse P of the laser radiation 3 is not constant, but rather has an intensity which increases from a minimum Ia through an average Ib to a maximum Ic and subsequently decreases over the temporal progression of the individual pulse as shown in FIG. 4, for example, in accordance with a normal distribution. Simultaneously, as a result of the variable intensity I, the refractive index, in particular also of a transmissive medium 8, changes in relation to an individual pulse P over the temporal progression t. As a result, the intensity-dependent focal points $9a$, $9b$, $9c$ of the laser radiation 3, which are shown in FIGS. $3a$ to $3c$, also change independently of the geometric focal point determined by focusing optics of a laser machining head 10. This effect is amplified by the transmissive medium 8, for example made of glass, which is arranged between the laser machining head 10 and the substrate 2 and which has a greater intensity-dependent refractive index than air, in such a way that the distance between the focal points $9a$, $9c$ between a maximum intensity Ic and a minimum intensity Ia at least corresponds to the desired longitudinal extension, in other words to the depth of the recess to be produced or, if, as shown, a separating face 5 is to be produced, to the material thickness d of the substrate 2. The intensity-dependent focal point $9a$, $9b$, $9c$ thus migrates along the beam axis Z from a position, which is shown in FIG. $3a$ and is at a distance from a rear face 11 of the substrate 2, in the direction of the laser machining head 10, and thus reaches all positions along the beam axis Z between the rear face 11 and a front face 12 facing the laser machining head 10 in a continuous movement, in such a way that the desired modification occurs in the region of the entire primary extension of the recesses which are subsequently to be produced.

Additionally, FIG. $3a$ shows, merely schematically, an additional laser machining head 13, which, to supplement a continuously emitting laser source connected to the laser machining head 10, directs the laser radiation 3 of a pulsed laser onto the glass substrate 2 selectively through or circumventing the transmissive medium 8. As a result, the intensity I, shown in FIG. 4, of an individual pulse P of the laser radiation 3 is accordingly amplified by the intensity of the continuously emitting laser source.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A device for separating a substrate, comprising:
   a laser machining head configured to deflect laser radiation onto the substrate, the laser machining head comprising focusing optics having a numerical aperture greater than 0.3; and
   a transmissive medium, the transmissive medium being a plane-parallel plate of a transmissive material having an intensity-dependent refractive index greater than air, the transmissive medium being disposed in a path of the laser radiation between the substrate and the laser machining head,
   wherein the transmissive medium is arranged on, and connected to, the laser machining head so as to be movable together with the laser machining head such that a relative position of the transmissive medium and the laser machining head remains fixed.

2. The device of claim 1, wherein the laser radiation is deflected through the transmissive medium, and
   wherein the transmissive medium transmits a wavelength of the laser radiation.

3. The device of claim 2, wherein the substrate comprises sapphire.

* * * * *